United States Patent
Dhurjaty et al.

(10) Patent No.: US 7,211,803 B1
(45) Date of Patent: *May 1, 2007

(54) WIRELESS X-RAY DETECTOR FOR A DIGITAL RADIOGRAPHY SYSTEM WITH REMOTE X-RAY EVENT DETECTION

(75) Inventors: Sreeram Dhurjaty, Rochester, NY (US); John Yorkston, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/409,883

(22) Filed: Apr. 24, 2006

(51) Int. Cl.
*G01T 1/24* (2006.01)
*H05G 1/60* (2006.01)

(52) U.S. Cl. .................... 250/370.09; 250/370.08; 378/21

(58) Field of Classification Search .......... 250/370.09, 250/370.08; 378/21, 114
See application file for complete search history.

(56) References Cited

U.S. PATENT DOCUMENTS 5,844,243 A * 12/1998 Lee et al. .............. 250/370.09
5,844,961 A    12/1998 McEvoy et al.
6,069,935 A     5/2000 Schick et al.
6,404,845 B1    6/2002 Sharpless et al.
6,797,960 B1 *  9/2004 Spartiotis et al. ...... 250/370.09
6,862,338 B2 *  3/2005 Kinno et al. ............ 378/98.8
2004/0065836 A1 4/2004 Schick et al.

OTHER PUBLICATIONS

U.S. Appl. No. 11/409,883, filed Dec. 2005, Dhurjaty et al.*
U.S Appl. No. 11/323,505, entitled: X-Ray Impingement Event Detection System and Method for a Digital Radiography Detector, filed Dec. 30, 2005 in the name of Dhurjaty et al.

* cited by examiner

*Primary Examiner*—David Porta
*Assistant Examiner*—David S. Baker
(74) *Attorney, Agent, or Firm*—Susan L. Parulski

(57) ABSTRACT

A wireless X-ray detector for a digital radiography system with remote detection of impinging radiation from the system X-ray source onto a sensor panel having amorphous or crystalline silicon photodiodes or metal insulated semiconductor (MIS) sensors. Changes in current in the photodiode bias supply circuit is sensed to generate a signal indicating presence of radiation. Improved detection of X-ray cessation is achieved either by leaving at least one line of sensors connected between the bias supply circuit to a virtual ground during charge accumulation or by using an X-ray presence detector circuit that increases the sensitivity of the detector circuit to bias circuit current changes occurring after onset of the radiation.

9 Claims, 2 Drawing Sheets

WIRELESS X-RAY DETECTOR FOR A DIGITAL RADIOGRAPHY SYSTEM WITH REMOTE X-RAY EVENT DETECTION

CROSS REFERENCE TO RELATED APPLICATIONS

Reference is made to commonly assigned U.S. patent application Ser. No. 11/323,505, entitled "X-RAY IMPINGEMENT EVENT DETECTION SYSTEM AND METHOD FOR A DIGITAL RADIOGRAPHY DETECTOR", filed on Dec. 30, 2005 in the names of Dhurjaty et al., incorporated herein by reference.

FIELD OF THE INVENTION

The invention relates generally to the field of medical imaging, and in particular to digital radiography. More specifically, the invention relates to a wireless X-ray detector for a digital radiography system employing remote X-ray event detection.

BACKGROUND OF THE INVENTION

Digital radiography is achieving a growing acceptance as an alternative to photographic-based imaging technologies that rely on photographic film layers to capture radiation exposure to produce and store an image of a subject's internal physical features. With digital radiography, the radiation image exposures captured on radiation sensitive layers are converted, pixel by pixel, to electronic image data which is then stored in memory banks for subsequent read-out and display on suitable electronic image display devices. One of the driving forces in the success of digital radiography is the ability to rapidly visualize and communicate stored images via data networks to one or more remote locations for analysis and diagnosis by radiologists without the delay caused by having to send physical films through the mail or via couriers to reach the remotely located radiologists.

Digital radiography panels have two-dimensional array of detecting elements ("pixels") organized in rows and columns. To read out image information from the panel, rows of pixels are usually selected sequentially and the corresponding pixel on each column is connected to a charge amplifier. The outputs of the charge amplifiers from each column are applied to analog-to-digital converters to generate digitized image data that then can be stored and suitably image processed as needed for subsequent display.

In order to synchronize image acquisition and subsequent data readout from the imaging panel, it is necessary to synchronize control of the panel operation with the occurrence of impinging imaging X-rays from a remote X-ray source contained in the digital radiography imaging system. This can be done by communicating control signals indicating start and stop of the X-ray source via a cable wire tether. More recently, wireless imaging cassettes have been proposed that operate independently of the main system by using X-ray sensors in the imaging cassette to detect the onset and terminate of the impinging X-rays from the remote X-ray source. Examples of such wireless and/or independent X-ray impingement sensing are found in U.S. Pat. No. 6,069,935 (Schick). In one such example, dedicated X-ray event trigger diodes located in the imaging cassette outside the imaging panel are monitored by a computer to detect incident radiation and output a signal indicating same. Such a system has certain drawbacks. The inclusion of the trigger diodes lowers manufacturing yields thereby making the cassettes unduly costly. Also, the diodes themselves may be blocked by some radiation impervious portion of the object under test or may be out of the field of the radiation beam entirely. In another example described in this patent, the sensors of the imaging panel itself are continuously read out using frame-grabbing techniques. Determination of whether the imaging sensors were exposed to X-rays is made by continuously reading out the frames of data from the entirety of the panel sensors and determining whether the panel was exposed to X-rays by examining the frames of data. A drawback is that the sensors must be read out continuously which consumes a relatively high amount of electrical power which can be a serious problem for a battery-power cassette operating independently of the main imaging system.

Another example is found in U.S. Pat. No. 6,404,845 (Sharpless) in which certain reference pixels in the imaging panel are monitored during a wait for exposure period, with the values of the reference pixels being compared to a predetermined threshold level. When a predetermined number of the reference pixels exceed the threshold level, a determination is made that the exposure level has commenced. This approach, however, also consumes a high amount of power and is, therefore, a less than desirable solution.

Yet another example is found in US Published Application No. 2004/0065836 (Schick). In this example, the occurrence of X-radiation on an imaging panel is detected by monitoring the amount of current drawn by the imaging pixels in the panel and an X-ray occurrence signal is generated when the amount of current drawn exceeds a predetermined amount. However, the example disclosed in this application is limited to use with CMOS or CCD sensors and is not applicable to other types of sensors such as amorphous or crystalline silicon photodiodes or metal insulated semiconductor (MIS) sensors in extensive use in filmless imaging X-ray sensor panels.

In such latter systems, it is important to be able to detect, in a reliable manner, not only the onset of X-ray exposure but also its cessation to properly initiate timing and control operations associated with readout of the charge voltages on the exposed pixels.

There is therefore a need for a wireless X-ray imaging sensor panel of the type using amorphous or crystalline silicon photodiodes or metal insulated semiconductor (MIS) sensors that is capable of operating independently of the main imaging system and that can remotely and reliably detect both the onset and cessation of impinging X-rays from an X-ray source in the main imaging system.

SUMMARY OF THE INVENTION

In accordance with one aspect of the invention, there is provided a wireless X-ray detector for a digital radiography system, and comprises a sensor panel, of amorphous or crystalline silicon photodiodes or metal insulated semiconductor photodiodes, which has a plurality of pixels arrayed in a matrix of rows and columns. Each pixel has a photodiode, a charge capacitor for collecting charge from the photodiode during X-ray exposure and a pixel switch. A pixel output amplifier defines a source of virtual ground and the pixel switch selectively couples the photodiode and charge capacitor to the source of virtual ground. A bias supply circuit is coupled to all the sensor panel pixels holding the photodiodes in a substantially non-conductive state in the absence of X-ray exposure. A control circuit is provided that holds the pixel switches closed during absence of X-ray exposure and that responds to the detection circuit upon onset of X-ray exposure of the pixels to open substantially all the pixel switches thereby disconnecting the pixel from the source of virtual ground to allow charge collection in the pixel capacitor. An X-ray presence detection circuit is provided that is responsive to a change in current flow in the bias supply circuit for indicating the onset and cessation of X-ray exposure on the pixels.

An advantage of the invention lies in the ability to detect rapidly and precisely the cessation of X-ray exposure in a wireless digital radiography X-ray detector by improving the signal to noise ratio of the exposure detection circuit after onset of full X-ray exposure.

Another advantage is that knowing the exact time X-ray exposure ceases enables more precise compensation of dark currents accumulated in the pixels during the exposure interval. Precise compensation improves the image quality of the system

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
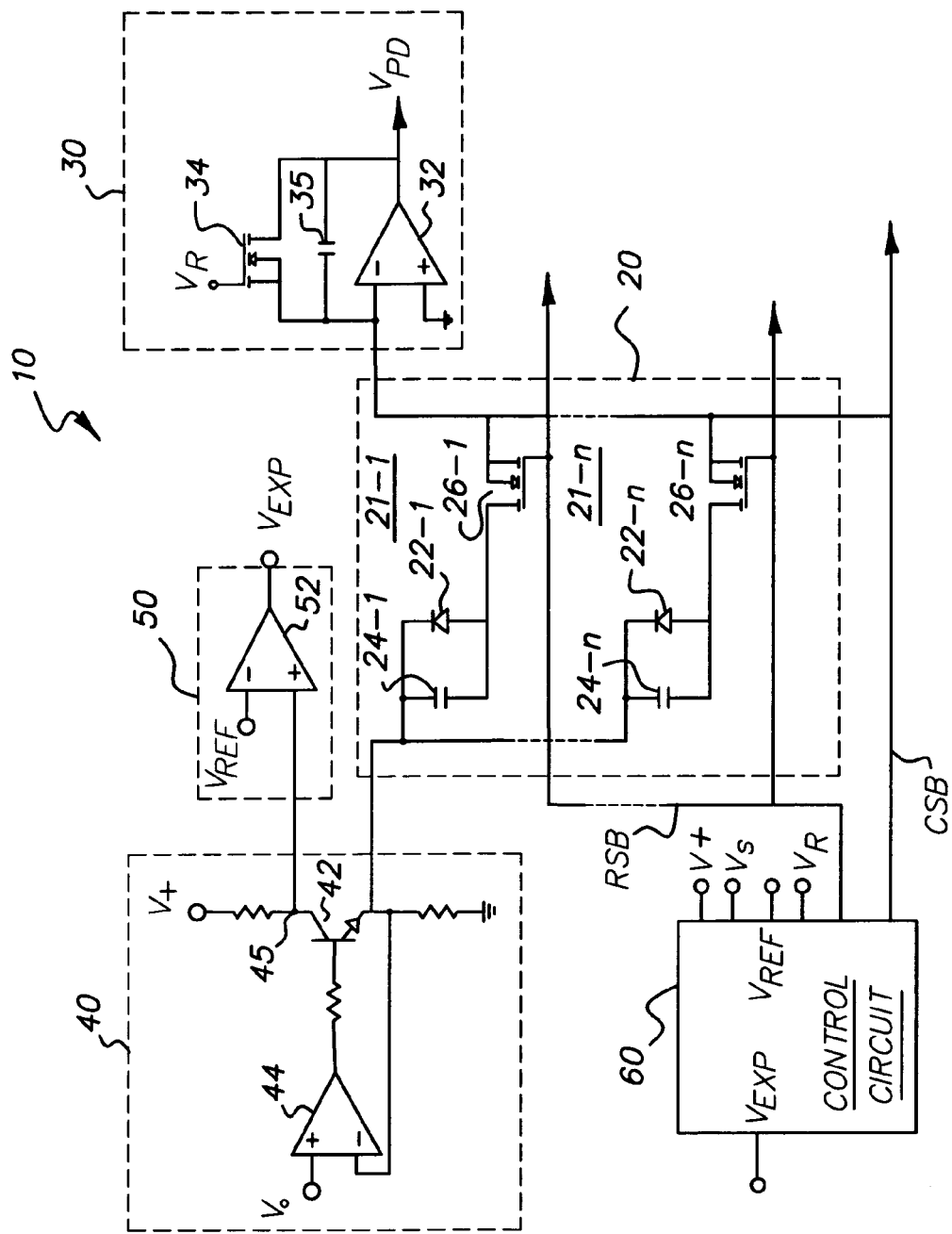
FIG. 1 shows a block diagram of one preferred embodiment of the X-ray exposure detector of the invention.

In FIG. 1, a wireless X-ray detector is shown which includes an X-ray sensor panel 20, a charge voltage photo-detector output amplifier 30, a photodetector bias supply circuit 40, an X-ray exposure presence detector 50 and a control circuit 60.

Sensor panel 20 is of amorphous or crystalline silicon or metal insulated semiconductor material. Panel 20 includes a plurality of pixels 21 arrayed in a matrix of rows and columns. For convenience, only a single column of pixels 21-1 to 21-n is illustrated. Each pixel includes a photodiode 22 and a charge capacitor 24 for collecting charge from the photodiode during X-ray exposure. Typically, capacitor 24 consists of the inherent capacitance of the photodiode 22. The pixel further includes a solid state output switch 26 which is preferably a thin film field-effect transistor.

Amplifier 30 comprises a charge amplifier 32 adapted to output pixel photodiode signals $V_{PD}$ after each X-ray exposure. Additionally, the negative-positive input terminals of this amplifier serve as a source of virtual ground potential for the pixel photodiode/capacitor combination whenever the corresponding pixel switch 26 is held closed. A reset input voltage $V_R$ is applied from control circuit 30 to thin film transistor to discharge capacitor 35 after each readout of photodetector signals from panel 20.

Bias supply circuit 40 includes an operational amplifier 44 coupled to the base of transistor 42. A selectable setup voltage Vs applied to the positive input terminal of opamp 44 establishes a fixed bias potential at the emitter-to-pixel connection to reverse bias the photodiode 22 during periods of no X-ray exposure on the detector 10.

X-ray exposure presence detection circuit 50 coupled to bias supply output terminal 45 is responsive to changes in current flow in the bias supply circuit for indicating the presence of X-ray exposure on the pixels. To this end, circuit 50 includes a comparator circuit 52 having its positive input terminal coupled to the collector of transistor 42 and its negative input terminal coupled to a voltage reference level applied from control circuit 60. The value of the reference level is set so that a significant change in voltage level at the output of the bias circuit above that caused by leakage current in the photodiodes will cross over the reference level and will trigger the comparator to output a signal indicating presence of X-ray exposure on the sensor panel 20.

Control circuit 60 has an input Vexp coupled from the output of detection circuit 50 and is responsive thereto to provide timing signals on row select bus RSB and column select bus CSB to selectively open and close pixel switches 26 during operation of the detector 10.

The following describes the operation of the detector 10. During periods when there is no X-ray exposure, control circuit 60 applies a signal via row select bus RSB to hold all pixel switches 26 closed. This effectively connects the bottom of the pixel photodiode/capacitor combinations to a virtual ground connection through the charge amplifier 32 input terminals. As a consequence, the bias supply voltage from bias supply circuit 40 holds the photodiodes 22 in a reverse bias condition, the reverse bias voltage being established at a desired level by the setup voltage Vs applied to the positive input of opamp 44. Cumulative leakage current through the many photodiodes causes a very low current flow through bias supply transistor 42 resulting in a positive voltage output being applied to the comparator 52 in detection circuit 50 thereby providing a low output state ("0") on terminal Vexp which is interpreted by control circuit 60 to hold all pixel switches in the closed condition.

Upon onset of radiation from the digital radiography source, the photodiodes in the sensor panel are driven into conduction. The cumulative effect of this current in all photodiodes causes a significant increase in current in the bias supply circuit which results in a drop in the voltage at the collector of transistor 42. When this drop falls below the voltage reference level Vref on detection circuit 50, the comparator circuit 52 is triggered thereby changing the output state Vexp to a "1" level. Control circuit 60 is responsive to this state change at input terminal Vexp to open substantially all pixel switches 26 thereby disconnecting the pixel photodiode/capacitance from the source of virtual ground so as to allow charge collection in the pixel capacitors. In a particularly preferred embodiment, the switches in at least one row are held closed by action of control circuit 60 thereby maintaining the connection of the photodiode/capacitance to virtual ground through charge amplifier 32 as described above. Alternatively, the photodiodes of the at least one row of pixels may be direct connected to virtual ground without intervention of a pixel switch. Thus, with this arrangement in which one or more rows of pixels are left connected to the charge amplifier, a closed circuit is maintained to the ground reference point which is necessary for the detection circuit 50 to detect the changes that occur in the bias supply current when the X-ray exposure ceases.

Although holding pixel switches closed for one or more lines of pixels during an exposure interval means that image data will be lost for the pixels with closed switches, the loss is readily compensated for in the subsequent digital image processor normally found in digital radiography detectors by interpolating, from adjacent rows, the data missing from the pixel rows in which the pixel switches were held closed.

Figure 2:
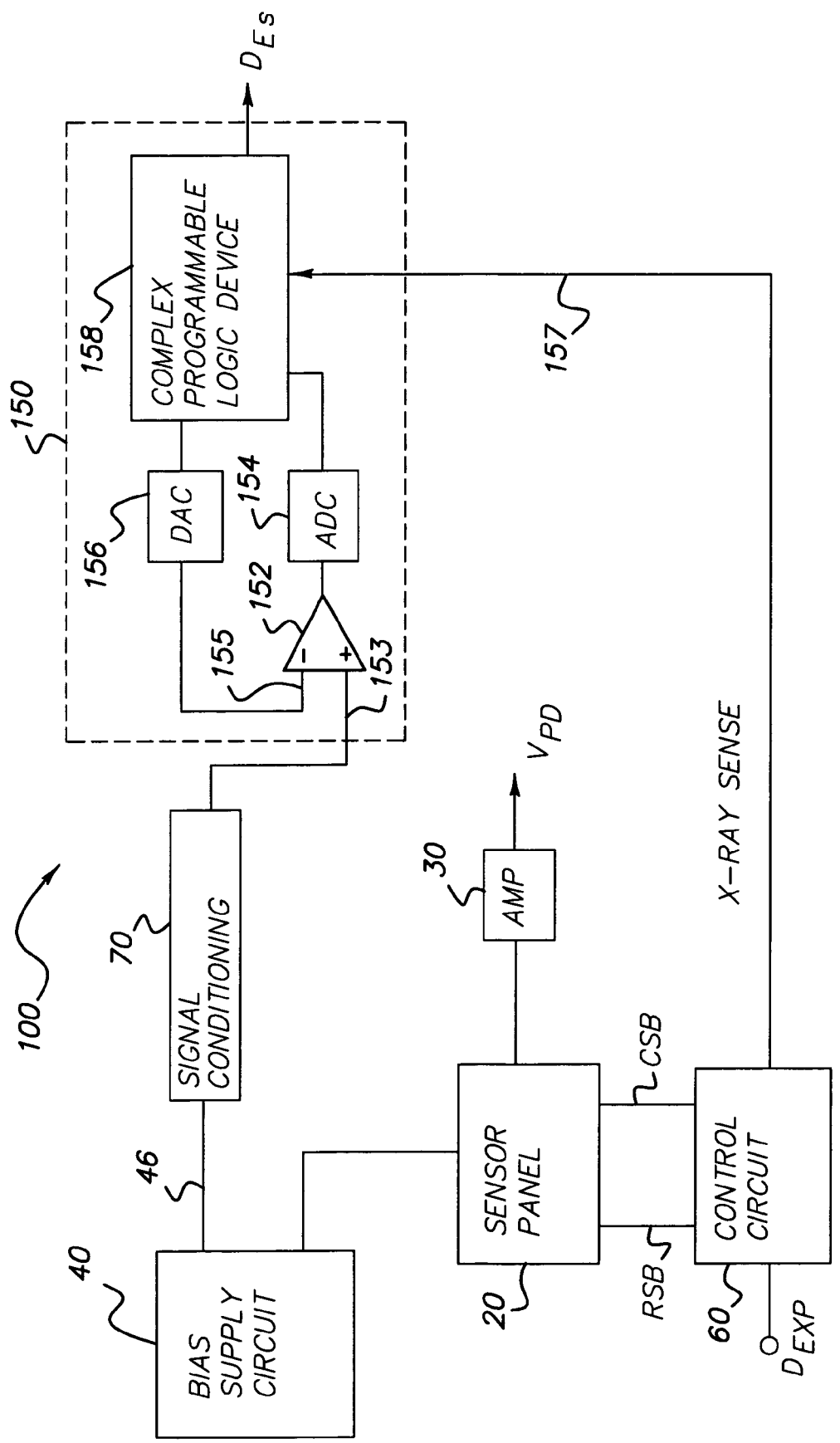
FIG. 2 shows a block diagram of an alternative preferred embodiment of the invention.

Turning now to FIG. 2, an alternative preferred embodiment of the invention is shown in which corresponding elements from FIG. 1 are given the same reference numerals. Thus the illustrated X-ray detector 100 includes sensor panel 20, charge amplifier 30 a bias supply circuit connected to the pixels of panel 20 and a control circuit 60 providing, inter alia, pixel control signals on row select bus RSB and column select bus CSB to control pixel switches as described above.

In this embodiment, digital processing in detector circuit 150 of the changing levels of voltage output from bias supply circuit is used to change the sensitivity of detector circuit to the voltage output of the bias circuit depending on whether there or not there is X-ray impingement on the senor panel 20. To this end, the bias circuit output voltage on line 46, which is representative of changes in bias circuit current, is applied via a signal conditioning circuit 70 to the positive input 153 of a differential amplifier 152. A complex programmable logic device (CPLD) is programmed at the time of reset and standby operation, when there is X-ray exposure, to apply a predetermined reference voltage value on input line 155 which is close to the "no X-ray" voltage on line 153. Upon onset of X-ray exposure, a significant differential voltage is output from amplifier 152 to an analog-to-digital converter 154 to provide a digital differential value to the CPLD. The CPLD 158 is programmed to respond to a predetermined differential value that is indicative of the onset of X-ray exposure to output a signal Dexp to the control circuit 60 to initiate opening of all the pixel switches in sensor panel 20 to allow charge accumulation in the pixel capacitors.

During the exposure interval, the bias circuit voltage output on line 46 comes to an equilibrium base voltage plus noise. While the voltage on line 46 is steady, CPLD 158 adjusts the output of digital to analog converter 156 to minimize the difference between the voltage on input lines 153 and 155. This serves to match the two input signals. While there are different ways to ensure this match is obtained, including counting threshold transitions or gating using a flip-flop array, using the CPLD is preferred since it allows the user to customize how to program in the system hysterisis. Once the match is obtained, that value is held on line 155 by the CPLD while it waits for the cessation of X-ray exposure. When the X-ray exposure stops, there is a corresponding current (and hence voltage) drop on bias circuit output line 46, as discussed above. This voltage drop causes the absolute difference voltage on input line 153 to move away from the previous minima value vis-à-vis the voltage on input line 155. Using an appropriate threshold value set in the CPLD, the CPLD is programmed to detect this change and output a signal Dexp indicating the cessation of X-ray exposure. Implementing this feedback system with a high resolution DAC 156 and ADC 154 and an adjustable gain amplifier 152 enables the realization of a very flexible system for low-level bias circuit output signal detection with adjustable set points.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A wireless X-ray detector for a digital radiography system, comprising:
   a sensor panel of amorphous or crystalline silicon photodiodes or metal insulated semiconductor photodiodes and having a plurality of pixels arrayed in a matrix of rows and columns, each pixel having a photodiode, a charge capacitor for collecting charge from the photodiode during X-ray exposure and a pixel switch;
   a pixel output amplifier defining a source of virtual ground, the pixel switch selectively coupling the photodiode and charge capacitor of all of the pixels to the source of virtual ground;
   a bias supply circuit coupled to all the sensor panel pixels holding the photodiodes in a reverse biased state during the absence of X-ray exposure;
   a control circuit responsive to the detection circuit for holding the pixel switches closed during absence of X-ray exposure and for opening substantially all the pixel switches upon detecting onset of X-ray exposure thereby disconnecting the pixel from the source of virtual ground so as to allow charge collection in the pixel capacitors; and
   an X-ray presence detection circuit responsive to a change in current flow in the bias supply circuit for indicating onset and cessation of X-ray exposure on the pixels.

2. The detector of claim 1 wherein the control circuit is responsive to a first change of bias supply circuit current upon onset of X-ray exposure to open the pixel switches and to a second change in bias supply circuit current upon cessation of X-ray exposure to sequentially close the switches for readout of charge collection values to the pixel output amplifier.

3. The detector of claim 2 wherein the control circuit continues to hold the switches of at least one row of pixels closed after detection of the onset of X-ray exposure wherein the detection circuit, upon cessation of X-ray exposure, is responsive primarily to current flow change in the bias supply circuit resulting from connection of the bias supply circuit to the pixels with the closed pixel switches.

4. The detector of claim 3 further comprising:
   an image processing unit for interpolating, from adjacent rows, digital image values for the at least one row of pixels.

5. The detector of claim 1 wherein the detection circuit comprises a differential detector circuit to sense the difference between a voltage in the bias supply circuit representative of the bias supply circuit current and a reference value, the output of the differential detector circuit indicating an output value representing onset of X-ray exposure.

6. The detector of claim 5 wherein the reference value of the detection circuit is adjustable and, after the onset of X-ray exposure, the output of the differential detector adjusts the reference value to substantially match the voltage output of the bias supply circuit;
   whereby the detection circuit is rendered more sensitive after onset of X-ray exposure to detection of changes in bias supply current occurring upon cessation of X-ray exposure.

7. The detector of claim 6 wherein the detection circuit further includes:
   an analog-to-digital converter to convert the differential detector output to a digital value;
   a digital-to-analog converter to input the reference level to the differential detector; and
   a programmable logic device interconnecting the analog-to-digital converter and the digital-to-analog converter for varying the adjustable reference level after the onset of X-ray exposure to substantially match the bias supply circuit input voltage to the differential amplifier.

8. The detector of claim 1 wherein the pixel switch is a thin film transistor.

9. The detector of claim 1 wherein the detection circuit includes a reference level and a comparator for comparing a voltage in the bias supply circuit to the reference level, the voltage being representative of bias supply circuit current.

* * * * *